United States Patent [19]
Gertsch

[11] 3,969,655
[45] July 13, 1976

[54] PROTECTIVE CIRCUIT ARRANGEMENT FOR CAPACITOR VOLTAGE TRANSFORMERS

[75] Inventor: Georges-Albert Gertsch, Zurich, Switzerland

[73] Assignee: Micafil A.G., Zurich, Switzerland

[22] Filed: Dec. 6, 1974

[21] Appl. No.: 530,425

Related U.S. Application Data

[63] Continuation of Ser. No. 336,239, Feb. 27, 1973, abandoned.

[52] U.S. Cl. ............................ 317/12 A; 317/50; 317/53
[51] Int. Cl.² .................................... H02H 7/16
[58] Field of Search ............ 317/12 R, 12 A, 12 B, 317/50, 36 TD, 16, 14 R, 20, 53; 307/93, 104

[56] References Cited
UNITED STATES PATENTS

| | | | |
|---|---|---|---|
| 3,401,272 | 9/1968 | Rosa et al. | 317/50 |
| 3,458,764 | 7/1969 | Gertsch et al. | 317/50 |
| 3,517,263 | 6/1970 | Okamura et al. | 317/12 R |
| 3,530,502 | 9/1970 | Nishidai | 317/12 B |

*Primary Examiner*—R. N. Envall, Jr.
*Assistant Examiner*—Patrick R. Salce
*Attorney, Agent, or Firm*—Pierce, Scheffler & Parker

[57] ABSTRACT

A protective circuit arrangement for a capacitor voltage transformer wherein a damping load is connected by switch means, following a voltage breakdown, to the secondary terminals of an intermediate transformer whose primary terminals are connected to the capacitor through a reactance coil.

19 Claims, 9 Drawing Figures

PROTECTIVE CIRCUIT ARRANGEMENT FOR CAPACITOR VOLTAGE TRANSFORMERS

This is a continuation, of application Ser. No. 336,239 filed Feb. 27, 1973, now abandoned.

The present invention concerns an improved protection circuit arrangement for capacitor voltage transformers which contain a switchable damping load.

The use of a load to attenuate relaxation oscillations and subsynchronous oscillations due to the saturation of the iron core of the transformer is already known. These oscillations will occur in connection with voltage increases at the terminals of the capacitor transformer, for example, during circuit-closing, a disconnection of a short-circuit on the secondary side etc., but never in case of a voltage breakdown. This arrangement has the disadvantage that the transient reactions in case of a short-circuit at the terminals on the primary side of the capacitor voltage transformer are controlled by the characteristic of the capacitor voltage transformer including its attached load. For this reason it had been suggested heretofore to load the transformer as lightly as possible (see CIGRE report No. 318, Session 1960, especially Section IV, as well as CIGRE report No. 31-14, Session 1968), in order to insure proper transient reactions.

Therefore, the above-mentioned damping load was, for example, not connected permanently, but for short periods of time only, by switching means whenever relaxation- or subsynchronous oscillations did occur. But even in case of such measures, there will still occur transient reactions which can have a very disturbing effect on the operations of the network-protecting relays, especially the quick-acting electronic relays.

The principal object of the invention is to reduce the undesirable transient reactions which will occur at the capacitor voltage transformer after a short-circuit at its primary terminals by means of a protective circuit arrangement.

This reduction in the transient reactions is accomplished, according to the invention, in that manner that as rapidly as possible after a voltage breakdown at the primary terminals of the transformer, but not later than 5 milliseconds after such voltage breakdown, a switchable damping load, its value a multiple of the rated burden of the transformer, will be added to the intermediate transformer T.

In most instances the damping load will be connected to the intermediate transformer T within a period of 1 to 3 milliseconds. This protective circuit arrangement of the invention will increase greatly the service reliability of the high-voltage network and avoid faulty trippings and delays in the response of the network-protecting relays.

It will be advisable to use an ohmic resistance of $$R_1 < \frac{1}{2 \cdot \ddot{u}_T^2} \cdot \sqrt{\frac{L}{C}}$$

for the damping load and to connect this load to the intermediate transformer T by means of a "Triac" or antiparallel-wired thyristors. In this formula, $\ddot{u}_T$ represents the ratio of transformation of the intermediate transformer T, L is the magnetizing inductance of this transformer on the primary side, and C is the equivalent capacity $C_1 + C_2$ of the capacitor divider.

The connection of the damping load can be triggered, in accordance with preferred arrangements, either by the voltage drop $U_{L_2}$ at an auxiliary inductance $L_2$, which is connected in series with the capacitive divider $C_1 C_2$, or by the voltage drop $U_{R_2}$ across a resistance $R_2$, which is placed in series with a parallel oscillating circuit $L_3 C_3$, tuned to the rated value of the power frequency.

It is also advantageous if the connection of the damping load is accomplished by utilization of the voltage at a condenser $C_4$, which is placed in series with a resistor $R_3$. This series circuit $R_3 C_4$ is connected to the voltage $U_s$ which is stabilized and has a constant value by means of a Zener diode. The time constant $\tau$ of the series circuit $R_3 C_4$ is computed preferably by the equation $$\tau \geq a \cdot \frac{\arcsin \left(\frac{U'_2}{bU_2 \cdot \sqrt{2}}\right)}{180 \cdot f_n \cdot \ln \left(\frac{U_s}{U_s - U_{Lmin}}\right)}$$

, wherein $a$ is a safety factor $bU_2$ is the lowest secondary voltage at which the protective circuit arrangement must still be operative, $U_2$ is the rated value of the secondary voltage of the capacitor voltage transformer, $U'_2$ is the cut-off value of the instantaneous value of the secondary voltage ($U_2$) at which the charge of the condenser ($C_4$) begins or ends respectively, $U_s$ is a stabilized d.c. voltage feeding the series circuit ($R_3 C_4$), $U_{Lmin}$ is the minimum charging voltage of the condenser ($C_4$) which will trip the protective circuit arrangement, $f_n$ is the rated value of the capacitor voltage transformer power frequency, and $l_n$ denotes the natural logarithm.

An NPN-switching transistor is connected in parallel with the condenser $C_4$, and the transistor will discharge this condenser when the voltage $U_2$ reaches the instantaneous value $U'_2$.

The control voltage between base and emitter of the switching transistor is obtained in the form of a pulsating direct current voltage from, and proportional to, the secondary voltage $U_2$ by way of a voltage divider $R_4 R_5$ and a bridge rectifier or by way of a transformer with center tap and two rectifiers. The emitter can be additionally biased with a stabilized voltage $U_D$. In order to suppress the influence of oscillations higher than the power frequency upon the circuits controlling the connection of the damping load, special means are provided, preferably filtering circuits, block circuits and the like. Thus, it will be possible to attain shorter time periods for the connection of the damping load.

It will be expedient to subdivide the damping load into several partial loads. This arrangement makes it possible first, to attain a damping in conformity with the actual need only, and secondly to utilize this damping load for the attenuation of the relaxation and subsynchronous oscillations by staggered disconnection of the partial loads, thereby avoiding generation of new, undesirable transient reactions which could be caused by the disconnection of excessively large damping loads. A particularly smooth disconnection of the damping load can be accomplished if the last partial load comprises a resistor $R_7$ in front of, and in series with a parallel oscillating circuit $L_4 C_5$, tuned to the power frequency. The condenser of the parallel oscillating circuit $L_4 C_5$ should possess at least a capacity value $C_5 > 1/7 \cdot \ddot{u}_T^2 \cdot C$.

In order to disconnect the partial loads, one or more time networks are employed in known manner, whereby the partial load circuits maintain their own connections until the disconnect commands are given by the time networks. The voltage drop at one or more of the parallel loads is utilized to maintain the closed-circuit condition of the switch elements.

In accordance with a further development there is preferably arranged a condenser $C_6$ as the storage component for the first half-wave, with the instantaneous value of the subsequent half-wave being subtracted from the voltage of the condenser $C_6$. Thus, there is established the difference between the peak amplitudes of two successive half-waves of the secondary voltage $U_2$, and this value is utilized for triggering the connection of the damping load in that manner that a triggering command will be forthcoming whenever a half-wave surpasses the preceding half-wave by a value in excess of a preset value.

Identical circuits are arranged for the two polarities. It is possible to combine an excess voltage protection for the medium voltage part of the capacitor voltage transformer. For example: The storage-condenser $C_6$ is discharged in case of voltage surges by a thyristor which is controlled by the voltage $U_2$, and the primary current of the intermediate transformer T can be combined with the circuit thusly that the damping loads will be connected whenever this current exceeds a specific value. This can be accomplished, for example, by discharging the storage condenser $C_6$ by means of a thyristor when the primary current of the intermediate transformer T reaches a preset value.

Practical examples of the circuitry proposed by the invention are shown in the accompanying drawings wherein.

The mode of operation of the arrangement proposed by the invention is explained in detail by using eight practical examples based on FIGS. 1 to 9.

Example 1 (see FIG. 1):

A capacitor voltage transformer, comprises an intermediate transformer T having its primary winding $T_1$ connected through an inductive reactance $L_1$ across a section $C_2$ of a capacitive voltage divider constituted by a plurality of capacitors $C_1, C_2$ connected in series between a high voltage source and ground. A secondary winding $T_2$ is provided and to the terminals of which is connected, after a breakdown of voltage $U_1$ at the primary terminals, the damping load $R_1$ by means of the switch element S, preferably a Triac.

Figure 1:
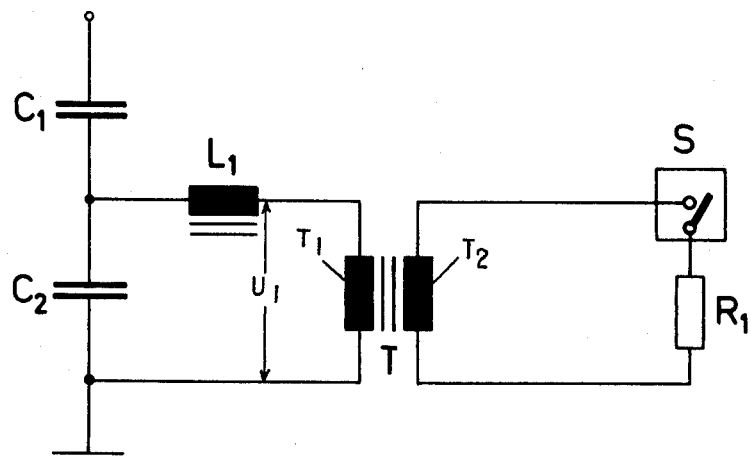
FIG. 1 shows a capacitor voltage transformer with a switchable damping burden $R_1$.
Figure 2:
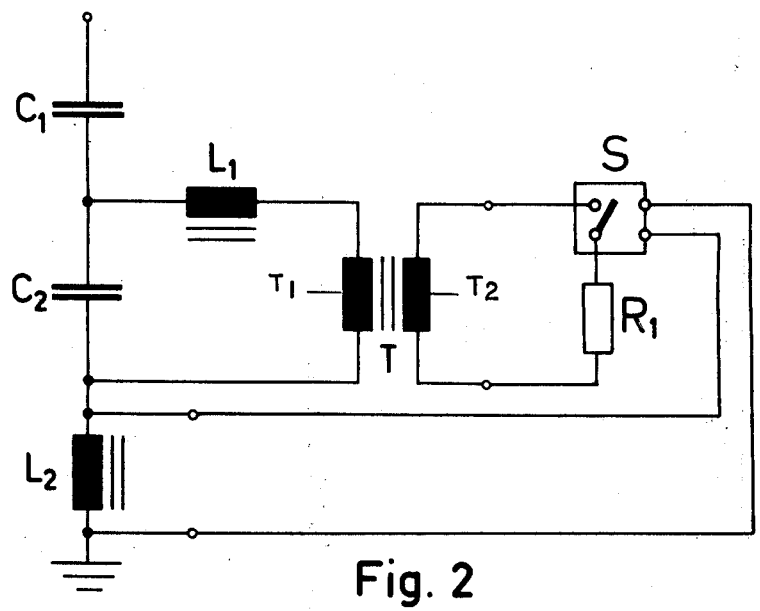
FIG. 2 shows the capacitor voltage transformer of FIG. 1 with a protective circuit which utilizes the voltage drop $U_{L_2}$ across an inductance $L_2$ which is connected in series with the capacitor voltage transformer $C_1 C_2$.
Figure 3:
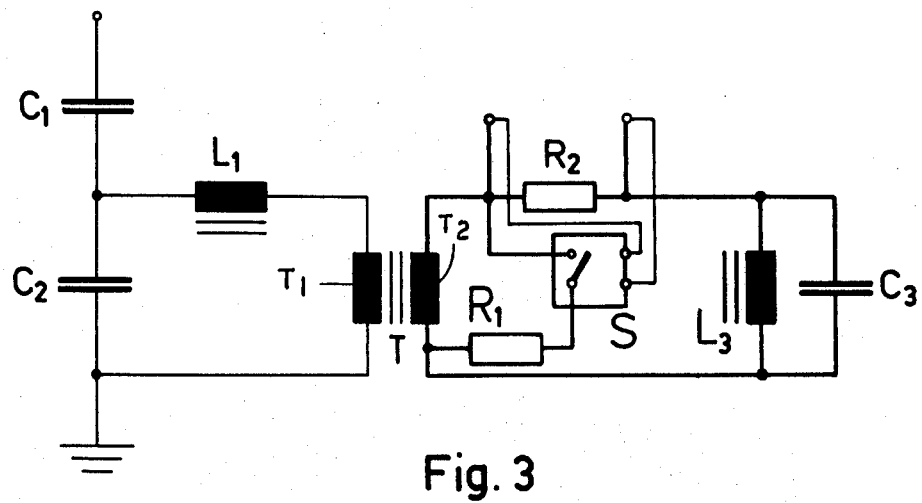
FIG. 3 shows the capacitor voltage transformer of FIG. 1 with a protective circuit which utilizes the voltage drop $U_{R_2}$ across a resistor $R_2$ which is connected in series with an oscillating circuit $L_3 C_3$.

Example 2 (see FIG. 2):

A capacitor voltage transformer as in FIG. 1 where the connection of the damping load is accomplished by the utilization of the voltage drop $U_{L_2}$ across the auxiliary inductance $L_2$, placed in series with the capacitive divider $C_1 C_2$.

Example 3 (see FIG. 3):

A capacitor voltage transformer according to the embodiment of FIG. 1, where the connection of the damping load is accomplished by the utilization of the voltage drop $U_{R_2}$ across the resistor $R_2$, placed in series with a parallel oscillating circuit $L_3 C_3$ which is tuned to the rated value of the power frequency.

Figure 4:
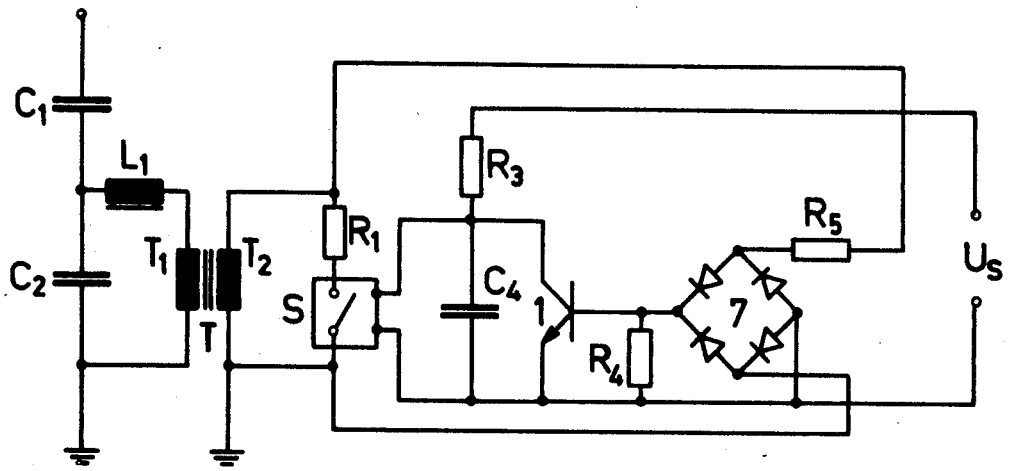
FIGS. 4 and 5 show the capacitor voltage transformer of FIG. 1 with a protective circuit which utilizes the voltage drop across a condenser $C_4$.
Figure 5:
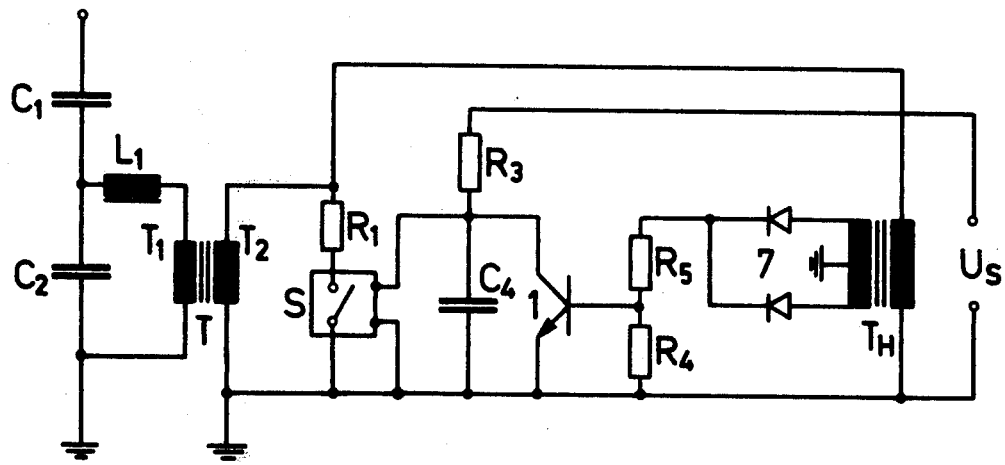
Figure 6:
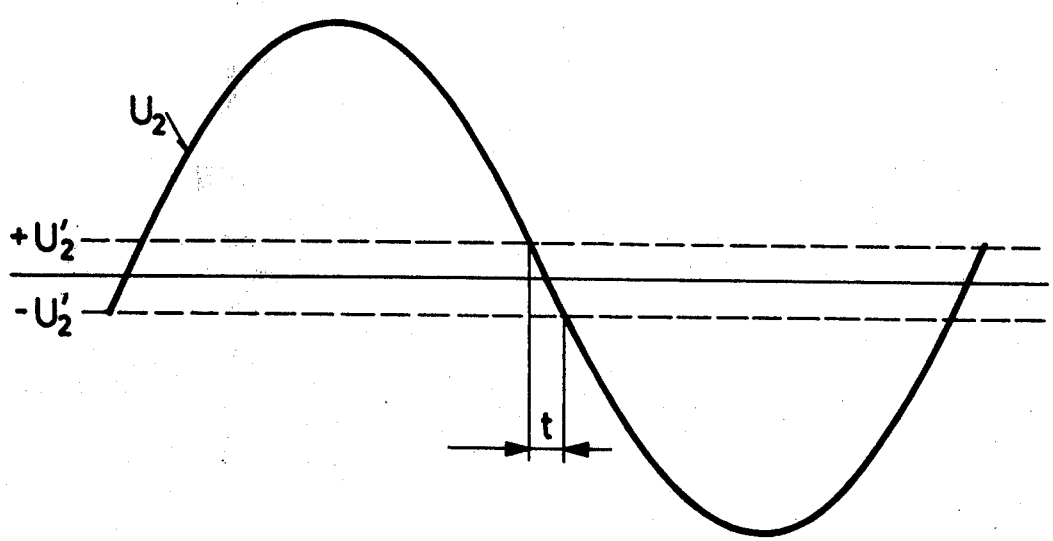
FIG. 6 depicts graphically the charging time $t$ of a condenser $C_4$, the sinusoidal secondary voltage $U_2$ of the capacitor voltage transformer as shown by FIG. 4 and the voltage limits $\pm U_2'$.
Figure 7:
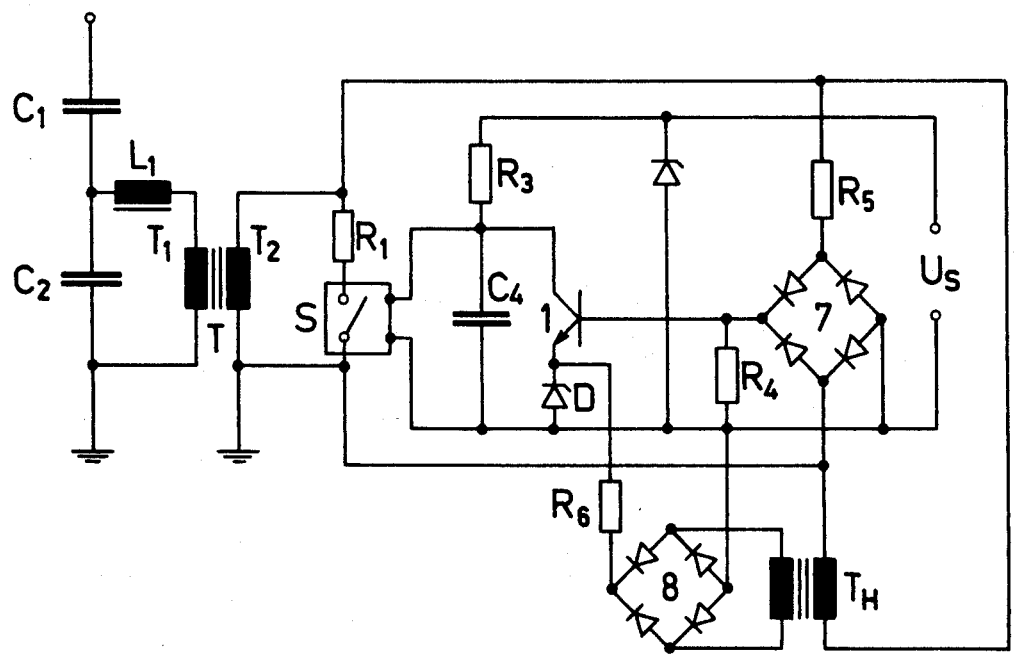
FIG. 7 shows the capacitor voltage transformer with a protective circuit as depicted by FIG. 4 with its bias stabilized by means of a Zener diode D.
Figure 8:
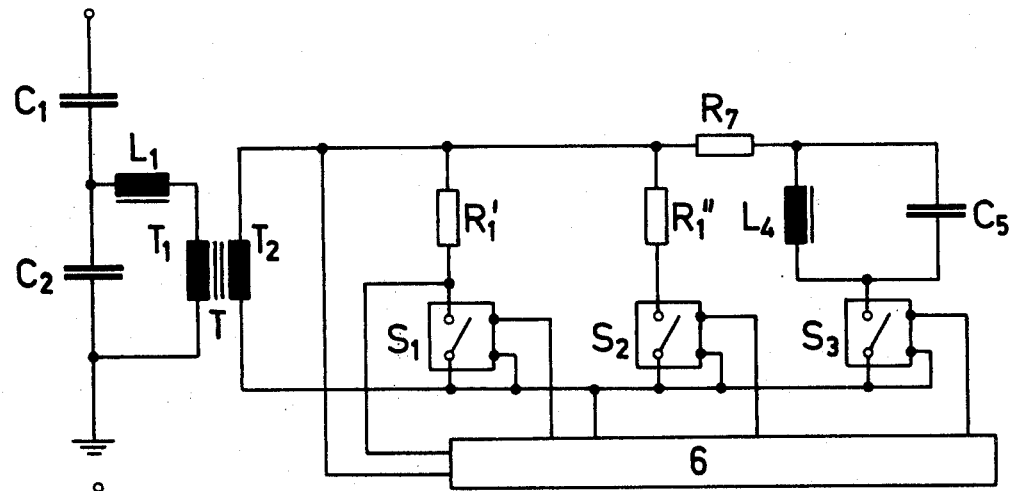
FIG. 8 shows the capacitor voltage transformer of FIG. 1 with a protective circuit which comprises a damping burden $R_1$ which can be cut off in three staggered steps.
Figure 9:
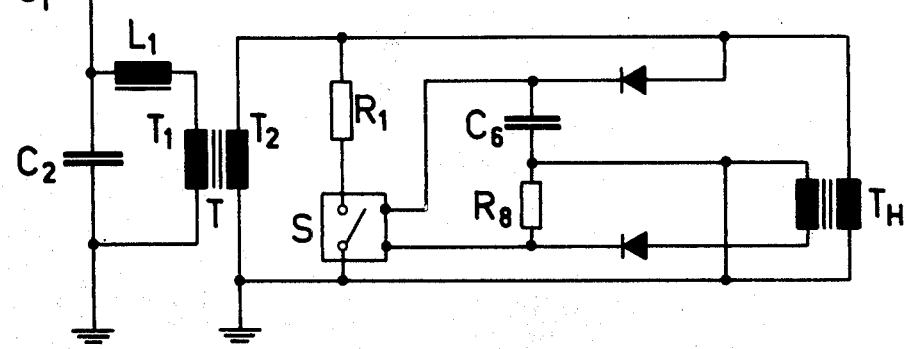
FIG. 9 shows the capacitor voltage transformer of FIG. 1 with a protective circuit which utilizes a storage condenser $C_6$.

Examples 4 and 5 (see FIGS. 4, 5 and 6)

FIG. 4 shows a capacitor voltage transformer, comprising the capacitor voltage divider $C_1 C_2$, the main choke $L_1$ and the intermediate voltage transformer T where a switch element S connects and disconnects the damping burden $R_1$. A d.c. voltage $U_s$ supplies a series circuit $R_3 C_4$. The condenser $C_4$ is charged through resistor $R_3$ at a time constant $\tau = R_3 C_4$ only during the period of time when a switch transistor 1, placed in parallel with the condenser $C_4$, is blocking i.e. so long as the instantaneous value of the secondary voltage lies between the limits $\pm U_2'$. The control of the switch transistor 1 takes place by way of an ohmic voltage divider $R_5 R_4$ and a rectifier using a bridge circuit 7. As soon as the voltage across the condenser $C_4$ reaches the value $U_{Lmin}$, the damping burden $R_1$ will be added and switched on by means of a switch element S.

In FIG. 5 is an alternative solution for the control of the switch transistor 1 which take place by way of an ohmic voltage divider $R_5 R_4$ an auxiliary transformer $T_H$ with center tap and two rectifiers 7. FIG. 6 shows graphically the charging time $t$ of the condenser $C_4$, the sinusoidal secondary voltage $U_2$ and the limit values $\pm U_2'$ of the capacitor voltage transformer.

Example 6 (see FIG. 7):

Using a circuit of example 4 as the basis, there is connected additionally a Zener diode D which generates the stabilized bias voltage $U_D$ at the emitter of the switch transistor 1. This bias is obtained for example, from the secondary voltage by way of the auxiliary transformer $T_H$, a rectifier using a bridge circuit 8 and a series resistor $R_6$.

Example 7 (see FIG. 8):

As previously stated, the damping burden may be advantageously sub-divided into several partial loads.

The capacitor voltage transformer shown here, comprises the capacitor voltage divider $C_1$ $C_2$, the main inductance $L_1$, the intermediate transformer T and three switch elements $S_1$, $S_2$, $S_3$ each of which will switch one stage of the damping burden. The first two stages $R_1'$ and $R_1''$ of the damping burden $R_1$ are completely ohmic, and the last stage is a parallel resonant circuit $L_4$ $C_5$ in series with an ohmic resistance $R_7$. The time component 6 triggers in known manner a staggered cut-off of the three stages of the damping burden. The voltage drop across the resistor $R_1'$ energizes the time component 6.

Example 8 (see FIG. 9): A capacitor voltage transformer as in FIG. 1 where the connection of the damping load $R_1$ is accomplished by the utilization of the difference in voltage $U_{C_6-R_8}$ between the voltage across the condenser $C_6$ and the instantaneous value of the voltage across a resistor $R_8$. The storage condenser $C_6$ is charged during the first half-wave of the secondary voltage $U_2$. The next half-wave will then generate through the auxiliary transformer $T_H$ a voltage drop across the ohmic resistor $R_8$.

The novel concept of the present invention is applicable to all capacitive voltage transformer independent of the art with which the voltage dividers $C_1$, $C_2$ or high voltage condeners $C_1$ are associated. Thus, the concept of the present invention can be applied to coupling condensers, cables, lead-through, current transformers and bus bars.

I claim:

1. A capacitor voltage transformer system comprising a capacitor voltage divider constituted by a plurality of capacitor sections connected in series between a high voltage source and ground, an intermediate voltage transformer including a primary winding connected across a section of said capacitive voltage divider through a principal inductive reactance, a secondary winding, a damping load having a value which is a multiple of the rated burden of said transformer, normally open switching means for connecting said damping load to said secondary winding, and means constituted by an auxiliary inductive reactance connected in series with said capacitor voltage divider for closing said switching means when the voltage drop across said auxiliary inductive reactance reaches a predetermined value in the event of a breakdown of the voltage at the terminals of the primary winding of said transformer.

2. A capacitor voltage transformer system as defined in claim 1 wherein the ohmic resistance $R_1$ of said damping load conforms to:

$$R_1 < \frac{1}{2 \cdot \ddot{u}''_T{}^2} \cdot \sqrt{\frac{L}{C}}$$

wherein: $\ddot{u}_T{}^2$ represents the transformation ratio of said intermediate voltage transformer, L is the magnetizing inductance of said transformer on the primary side, and C is the equivalent capacity of said capacitor voltage divider.

3. A capacitor voltage transformer system comprising a capacitor voltage divider constituted by a plurality of capacitor sections connected in series between a high voltage source and ground, an intermediate voltage transformer including a primary winding connected across a section of said capacitor voltage divider through a principal inductive reactance, a secondary winding, a damping load having a value which is a multiple of the rated burden of said transformer, normally open switching means for connecting said damping load to said secondary winding, and means for closing said switching means comprising a series arranged resistor and oscillator circuit connected to said secondary winding, said oscillator circuit including parallel connected inductive and capacitive reactance tuned to the nominal operating frequency of said voltage source, and said switching means being responsive to and actuatable to its closed state by the voltage drop across said resistor when said voltage drop reaches a predetermined value in the event of a breakdown of the voltage at the terminals of the primary winding of said transformer.

4. A capacitor voltage transformer system as defined in claim 3 wherein the ohmic resistance $R_1$ of said damping load conforms to:

$$R_1 < \frac{1}{2 \cdot \ddot{u}''_T{}^2} \cdot \sqrt{\frac{L}{C}}$$

$\ddot{u}_T{}^2$ represents the transformation ratio of said intermediate voltage transformer, L is the magnetizing inductance of said transformer on the primary side, and C is the equivalent capacity of said capacitor-voltage divider.

5. A capacitor voltage transformer system comprising a capacitor voltage divider constituted by a plurality of capacitor sections connected in series between a high voltage souce and ground, an intermediate voltage transformer including a primary winding connected across a section of said capacitor voltage divider through a principal inductive reactance, a secondary winding, a damping load having a value which is a multiple of the rated burden of said transformer, normally open switching means for connecting said damping load to said secondary winding, and means for closing said switching means, comprising a control capacitor and a series connected charging resistor therefor, said control capacitor being charged through said resistor when the absolute instantaneous value of the voltage of said secondary winding is lower than a predetermined value, and said switching means being responsive to and actuatable to its closed state when the instantaneous voltage of said control capacitor reaches a predetermined value in the event of a breakdown of the voltage at the terminals of the primary winding of said transformer.

6. A capacitor voltage transformer system as defined in claim 5 wherein the ohmic resistance $R_1$ of said damping load conforms to:

$$R_1 < \frac{1}{2 \cdot \ddot{u}''_T{}^2} \cdot \sqrt{\frac{L}{C}}$$

wherein: $\ddot{u}_T{}^2$ represents the transformation ratio of said intermediate transformer, L is the magnetizing inductance of said transformer on the primary side, and C is the equivalent capacity of said capacitor-voltage divider.

7. A capacitor voltage transformer system as defined in claim 5 wherein there is further provided a voltage source for charging said control capacitor and which includes a Zener diode for stabilizing the voltage.

8. A capacitor voltage transformer system as defined in claim 5 and which further includes a switching transistor connected in parallel with said control capacitor and which is controlled in accordance with a d.c. voltage obtained from a rectifier deriving its input from said secondary winding.

9. A capacitor voltage transformer system as defined in claim 8 wherein said rectifier which supplies the d.c. voltage for said switching comprises a rectifier bridge and a d.c. voltage divider.

10. A capacitor voltage transformer system as defined in claim 9 and which further includes a stabilized biasing voltage for the emitter of said switching transistor.

11. A capacitor voltage transformer system as defined in claim 8 wherein said rectifier which supplies the d.c. voltage for said switching transistor comprises a transformer with center tap, two rectifiers and a d.c. voltage divider.

12. A capacitor voltage transformer system as defined in claim 11 and which further includes a stabilized biasing voltage for the emitter of said switching transistor.

13. A capacitor voltage transformer system as defined in claim 5 wherein the time constant $\tau$ of said series connected control capacitor and charging resistor therefor conforms to:

$$\tau \geq a \cdot \frac{\arcsin\left(\frac{U'_2}{bU_2 \cdot \sqrt{2}}\right)}{180 \cdot f_n \cdot \ln\left(\frac{U_s}{U_s - U_{Lmin}}\right)}$$

wherein:
 $a$ is a safety factor
 $bU_2$ is the lowest secondary voltage at which the switching means must still be operative,
 $U_2$ is the rated value of the secondary voltage of the capacitor voltage transformer,
 $U'_2$ is the cut-off value of the instantaneous value of the secondary voltage ($U_2$) at which the charge of the control capacitor begins or ends respectively,
 $U_s$ is a stabilized d.c. voltage feeding the series connected control capacitor and charging resistor,
 $U_{Lmin}$ is the minimum charging voltage of the control capacitor which will connect in the damping load,
 $f_n$ is the rated value of the operating frequency of the high voltage source, and
 $l_n$ denotes the natural logarithm.

14. A capacitor voltage transformer system as defined in claim 5 and which further includes a rectifier and a capacitor serving as a storage element for one half of the voltage wave, an auxiliary transformer having a primary winding connected to the output terminals from said secondary winding, the secondary winding of said auxiliary transformer includes a rectifier and a resistor thereby to provide a difference voltage when the stored capacitor voltage is subtracted from the voltage across the resistor during the next following half of the transformed voltage wave, and means utilizing said difference voltage to effect a connection of the damping load to said secondary winding of the intermediate voltage transformer upon occurrence of undesirable relaxation and subsynchronous oscillations.

15. A capacitor voltage transformer system comprising a capacitive voltage divider constituted by a plurality of capacitor sections connected in series between a high voltage source and ground, an intermediate voltage transformer including a primary winding connected across a second of said capacitive voltage divider through a principal inductive reactance, a secondary winding, a damping load having a value which is a multiple of the rated burden of said transformer, said damping load being subdivided into a plurality of partial loads, switching means correlated respectively with each said partial damping load for connecting said partial damping load to said secondary winding, and a time network for controlling the operation of said switching means.

16. A capacitor voltage transformer system as defined in claim 15 wherein one of said partial damping loads is constituted by an oscillator circuit consisting of parallel-connected capacitor and inductive elements, said oscillator circuit being tuned to the rated value of the operating frequency of said high voltage source.

17. A capacitor voltage transformer system as defined in claim 16 and which further includes an ohmic resistor connected in series with said oscillator circuit.

18. A capacitor voltage transformer system as defined in claim 16 wherein the capacitor element of said oscillator circuit has a coefficient of capacity $C_{coef}$ conforming to:

$$C_{coef.} > 1/7 \cdot ü_T^2 \cdot C$$

wherein:
 $ü_T$ represents the transformation ratio of said intermediate voltage transformer and C the equivalent capacity of said capacitor voltage divider.

19. A capacitor voltage transformer system as defined in claim 15 and wherein the voltage drop across one of said partial damping loads is utilized to maintain said switching means in a closed-circuit condition.

* * * * *